US011455175B2

(12) United States Patent
Dima et al.

(10) Patent No.: US 11,455,175 B2
(45) Date of Patent: Sep. 27, 2022

(54) TRANSPARENTLY REMOTE EXECUTION OF DEVELOPMENT TOOL EXTENSIONS

(71) Applicant: Microsoft Technology Licensing, LLC, Redmond, WA (US)

(72) Inventors: Alexandru Ioan Dima, Zurich (CH); Dirk Bäumer, Zurich (CH); André Weinand, Zurich (CH); Erich Gamma, Zurich (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 517 days.

(21) Appl. No.: 16/036,815

(22) Filed: Jul. 16, 2018

(65) Prior Publication Data
US 2020/0019410 A1    Jan. 16, 2020

(51) Int. Cl.
*G06F 9/448* (2018.01)
*G06F 8/70* (2018.01)
(Continued)

(52) U.S. Cl.
CPC .......... *G06F 9/448* (2018.02); *G06F 8/70* (2013.01); *G06F 9/44521* (2013.01); *G06F 9/45558* (2013.01); *G06F 9/54* (2013.01)

(58) Field of Classification Search
CPC ........ G06F 9/448; G06F 8/70; G06F 9/44521; G06F 9/45558; G06F 9/54
See application file for complete search history.

(56) References Cited

U.S. PATENT DOCUMENTS 7,359,990 B2 * 4/2008 Munir ............... G06F 8/33
709/245
8,464,256 B1 * 6/2013 Havemose ........ G06F 9/4856
718/1
(Continued)

OTHER PUBLICATIONS

Berners-Lee et al, Uniform Resource Identifier (URI): Generic Syntax, Jan. 2005, Network Working Group, RFC: 3986, pp. 1-61 (Year: 2005).*

(Continued)

*Primary Examiner* — John A Follansbee
*Assistant Examiner* — Raqiul A Choudhury
(74) *Attorney, Agent, or Firm* — Ogilvie Law Firm

(57) ABSTRACT

Enhancements described support transparent remote execution of development tool extensions. Compute-intensive extensions may be executed on an extension machine external to a developer machine which runs a user interface renderer of the development tool. User interface extensions may run locally. Instead of sharing a filesystem, the renderer on the developer machine and an extension host and extension(s) on the extension machine may access distinct respective machine filesystems. Instead of spawning debug extension and other extension-support processes locally, the renderer may instruct the extension host or an extension host agent to spawn the processes remotely on the extension machine. Existing extensions and newly created extensions are binary-compatible with single-machine or multi-machine development tool deployments. Project files remain inside a firewalled and data-loss-prevention environment while being fully accessible to authorized developers working remotely and to operations performed by language servers, debug adapters, and tool extensions.

20 Claims, 7 Drawing Sheets

(51) Int. Cl.
*G06F 9/445* (2018.01)
*G06F 9/455* (2018.01)
*G06F 9/54* (2006.01)

(56) References Cited

U.S. PATENT DOCUMENTS

| | | | | |
|---|---|---|---|---|
| 9,736,147 | B1* | 8/2017 | Mead | H04L 63/083 |
| 10,230,687 | B1* | 3/2019 | Duleba | H04L 61/6086 |
| 2004/0088676 | A1* | 5/2004 | Gazdik | G06F 9/44521 |
| | | | | 717/101 |
| 2006/0168565 | A1 | 7/2006 | Gamma et al. | |
| 2009/0019426 | A1 | 1/2009 | Baeumer et al. | |
| 2009/0248695 | A1* | 10/2009 | Ozzie | H04L 67/2861 |
| 2013/0019157 | A1 | 1/2013 | Weinand et al. | |
| 2017/0072309 | A1* | 3/2017 | Perry | A63F 13/358 |
| 2017/0220394 | A1* | 8/2017 | Shim | G06F 9/5044 |
| 2018/0129584 | A1 | 5/2018 | Somasundaram et al. | |
| 2018/0322136 | A1* | 11/2018 | Carpentier | G06F 16/168 |
| 2019/0332683 | A1* | 10/2019 | Thummala | H04L 63/08 |

OTHER PUBLICATIONS

"Visual Studio Code", retrieved from <<https://en.wikipedia.org/wiki/Visual_Studio_Code>>, Jun. 7, 2018, 4 pages.
"JetBrains", retrieved from <<https://en.wikipedia.org/wiki/JetBrains>>, Jun. 21, 2018, 4 pages.
"Eclipse (software)", retrieved from <<https://en.wikipedia.org/wiki/Eclipse_(software)>>, Jun. 18, 2018, 10 pages.
"Genuitec", retrieved from <<https://en.wikipedia.org/wiki/Genuitec>>, Apr. 18, 2018, 3 pages.
"Remote Development", retrieved from <<https://nuclide.io/docs/features/remote/>>, no later than Jun. 26, 2018, 6 pages.
"Uniform Resource Identifier", retrieved from <<https://en.wikipedia.org/wiki/Uniform_Resource_Identifier>>, Jun. 30, 2018, 11 pages.
"Network socket", retrieved from <<https://en.wikipedia.org/wiki/Network_socket>>, Jul. 3, 2018, 8 pages.
"Virtual machine", retrieved from <<https://en.wikipedia.org/wiki/Virtual_machine>>, Jul. 3, 2018, 8 pages.
"Compatibility layer", retrieved from <<https://en.wikipedia.org/wiki/Compatibility_layer>>, Aug. 11, 2017, 4 pages.
"Windows Subsystem for Linux", retrieved from <<https://en.wikipedia.org/wiki/Windows_Subsystem_for_Linux>>, Jul. 3, 2018, 4 pages.
"Data access layer", retrieved from <<https://en.wikipedia.org/wiki/Data_access_layer>>, Aug. 21, 2017, 2 pages.
"File system", retrieved from <<https://en.wikipedia.org/wiki/File_system>>, Jun. 24, 2018, 20 pages.
"International Search Report and Written Opinion Issued in PCT Application No. PCT/US19/039359", dated Oct. 25, 2019, 12 Pages.
"Office Action Issued in European Patent Application No. 19740206.8", dated Jan. 27, 2022, 5 Pages.
"Office Action Issued in European Patent Application No. 19740206.8", dated Jun. 30, 2022, 4 Pages.

* cited by examiner

TRANSPARENTLY REMOTE EXECUTION OF DEVELOPMENT TOOL EXTENSIONS

BACKGROUND

Noon Software is created, tested, feature enhanced, corrected, performance optimized, and otherwise developed using software development tools. Familiar functions of such development tools include text editing functions, syntax checking, source code completion, automatic and computer-assisted code generation, compiling, executable building, defect detection and debugging, provisioning and deployment, and performance monitoring and profiling, for example. Software development tools partially or fully automate such functions, in order to improve developer productivity and reduce downtime or time-to-market. Some development tools are stand-alone programs, while other development tools are provided in a suite for coordinated usage, such as an integrated development environment. Some development tools are tailored to one or more particular programming languages while other tools, or at least portions thereof, are programming language agnostic, meaning they do not rely on or take advantage of features that are specific to a particular programming language.

SUMMARY

Some teachings herein were motivated by an initial technical challenge of making available, for remote execution across multiple machines having respective filesystems, a large body of existing development tool extensions which had evolved in a single-machine environment using a single filesystem, and doing so without making any changes whatsoever to those existing extensions. Some subordinate challenges which emerged included how to redesign an existing filesystem access mechanism that presumes a single local filesystem, in order to support access to a remote filesystem, and how to redesign the existing filesystem access mechanism to support an efficient division of accesses between a remote filesystem and a local filesystem. Another emergent subordinate challenge was how to redesign an existing process spawning mechanism that presumes all tool processes run on a single machine, in order to support remotely spawning some but not all of the tool processes. Other technical challenges addressed by the innovations taught here will also be apparent to one of skill from the discussion provided below.

In some embodiments a development tool includes a developer machine, and an extension machine that is external to the developer machine. These may be distinct virtual machines or distinct physical machines. In addition to a processor and a memory, the developer machine has a development tool user interface renderer ("renderer") which communicates with a development tool extension ("extension"). The extension is located on the extension machine. The extension itself may have pre-existed the present innovations, or it may be an extension created after the teachings herein were presented. Thus, the same extension binaries can run in the innovative tool as ran in one or more pre-existing tools.

In this example, the renderer communicates with the extension, directly or indirectly through a network connection, by sending and receiving inter-machine communications which identify one or more of the software development operations. The renderer is configured to use uniform resource identifiers ("URIs") to identify files in a filesystem in a store on the extension machine. In some cases, the renderer is also configured to specify in one or more of the inter-machine communications one or more development processes to be spawned on the extension machine instead of the renderer itself spawning those development processes on the machine the renderer runs on.

In addition to its own processing power and memory, the extension machine in this example has an extension host agent ("agent") which communicates with the renderer. This extension machine also has an extension host ("host") which communicates with the agent, and communicates with one or more extensions, and communicates with the extension machine store. Files in the extension machine store are identified in at least one place outside the extension machine by URIs, which get mapped to filesystem paths for use in the extension to identify the files in order to obtain the file contents from the extension machine store.

In some embodiments, executing a development tool extension to perform software development operations on file contents includes running the renderer on the developer machine, connecting the developer machine to the extension machine for inter-machine communications, and executing the extension on the extension machine. The extension machine store's filesystem contains software development files holding contents for the extension to operate on. This example method also includes identifying at least one of the software development files in the renderer using a uniform resource identifier file identification ("URI file ID"), mapping the URI file ID into a filesystem path file identification ("path file ID") of the software development file, and accessing the software development file in the extension machine store using the path file ID.

Other technical activities pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
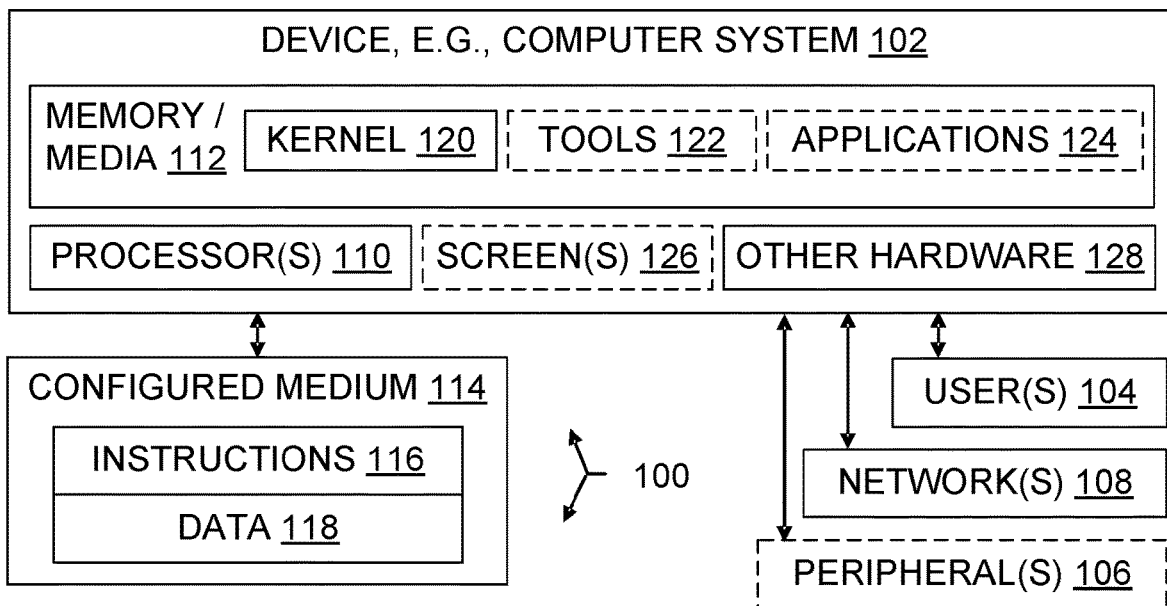
FIG. 1 is a block diagram illustrating a computer system and also illustrating a configured storage medium.

Remote development is a development practice receiving attention from large software development companies like social network providers, application-enabled gig economy brokers, streaming providers, other online service providers, and some other companies that develop software. When practicing remote development, developers do not work on locally checked out files, at least not primarily. Instead, developers connect from a local machine to a remote machine, where the files are checked out. Remote development allows enterprises to provide their developers with a fully controlled development environment, e.g., source code is kept behind a firewalled perimeter with strong authentication, authorization, and other security controls in place.

But one technical challenge is that the development tool used for such remote activity ideally provides at least the same level of developer support as the developer would have for local development, in terms of both features and performance. For instance, even when remoted a development tool should provide accustomed support levels for language features such as identifier auto-completion, background syntax checks, and integrated source control. Running such development tool services locally and fetching the files from a remote store is not a viable option for relatively large projects, e.g., those in which relevant files may collectively contain hundreds of thousands of lines of source code.

Another complicating issue is that routines and data structures providing these development tool services are often not embedded into the tool's core code but are provided instead by tool extensions. Thus, attempts to support remote development could lead to the imposition of difficult, delivery-delaying, and expensive change requirements on existing extensions, or could precipitate similarly undesirable implementation of new extensions that will support remote development. This issue is compounded by the fact that modern development tools work with or provide functional access to many extensions, and developers are accustomed to developing with their chosen existing set of extensions.

To mitigate or overcome functionality barriers associated with these and other technical challenges, embodiments described herein provide a family of development tool architectures and corresponding implementations. Teachings herein describe development tool systems which place a user interface renderer on a developer machine, place an extension host and extensions on a potentially remote extension machine, and provide suitable inter-machine communication. Some embodiments provide file identification mechanisms which permit the renderer to identify extension machine files without requiring a filesystem be shared by the renderer and the extensions. Some embodiments permit the renderer to spawn debug processes and other development tasks on the extension machine to support development regardless of the distance between the two machines.

Solutions described herein allow companies to avoid abandoning familiar extensions or developing new extensions specifically to support remote development. Accustomed support levels for language features are provided, by a division of functionality between the developer machine and the extension machine. Security controls are maintained, or supplemented. Other advantages will also become apparent.

Some embodiments described herein may be viewed by some people in a broader context. For instance, concepts such as communication, development, extension, machines, mappings, and processes, may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to reduce memory usage by editable text or speed file loading into a text editor. Other configured storage media, systems, and methods involving communication, development, extension, machines, mappings, or processes are outside the present scope. Accordingly, vagueness, mere abstractness, lack of technical character, and accompanying proof problems are also avoided under a proper understanding of the present disclosure.

Technical Character

The technical character of embodiments described herein will be apparent to one of ordinary skill in the art, and will also be apparent in several ways to a wide range of attentive readers. Some embodiments address technical activities that are rooted in computing technology and improve the functioning of computing systems by helping those systems make more extensive use of existing development tool extensions, including remote use of existing extension binaries. As a consequence there is no need to migrate all the existing extensions, and developers will get at least the same comfort from working with the existing extensions as they have had when developing locally prior to remote extension execution capability availability.

Technical effects provided by some embodiments include a more flexible use of development tool extensions by supporting deployments with different combinations of physical machines or virtual machines, machines with different kinds of kernels, machines with different security controls, and different interoperability mechanisms.

Some embodiments include technical adaptations such as file identifier mappings, process spawning operations, communication agents, and network connection detections.

Other advantages based on the technical characteristics of the teachings will also be apparent to one of skill from the description provided.

Acronyms, Abbreviations, and Names

Some acronyms, abbreviations, and names are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DAP: debug adapter protocol
DVD: digital versatile disk or digital video disc
FPGA: field-programmable gate array
FPU: floating point processing unit
Git: version control system
GPU: graphical processing unit
GUI: graphical user interface
HTTPS: hypertext transfer protocol secure
IP: internet protocol
Java: programming language
LAN: local area network
LSP: language server protocol
OS: operating system
RAM: random access memory
ROM: read only memory
TCP/IP: transmission control protocol/internet protocol
UDP: user datagram protocol
URI: uniform resource identifier
VIM: a configurable text editor
VS Code: Visual Studio® Code program (mark of Microsoft Corp.)
WAN: wide area network
Note Regarding Hyperlinks Portions of this disclosure contain URIs, hyperlinks, IP addresses, and/or other items which might be considered browser-executable codes. These items are included in the disclosure for their own sake to help describe some embodiments, rather than being included to reference the contents of the web sites or files that they identify. Applicants do not intend to have these URIs, hyperlinks, IP addresses, or other such codes be active links. None of these items are intended to serve as an incorporation by reference of material that is located outside this disclosure document. Thus, there should be no objection to the inclusion of these items herein. To the extent these items are not already disabled, it is presumed the Patent Office will disable them (render them inactive as links) when preparing this document's text to be loaded onto its official web database. See, e.g., United States Patent and Trademark Manual of Patent Examining Procedure § 608.01 (VII).

Additional Terminology

Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, and so on.

"Kernels" include operating systems, hypervisors, virtual machines, BIOS code, and similar hardware interface software.

"Code" means processor instructions, data (which includes constants, variables, and data structures), or both instructions and data. "Code" and "software" are used interchangeably herein. Executable code, interpreted code, and firmware are some examples of code. Code which must be interpreted or compiled in order to execute is referred to as "source code".

"Program" is used broadly herein, to include applications, kernels, drivers, interrupt handlers, firmware, state machines, libraries, and other code written by programmers (who are also referred to as developers) and/or automatically generated.

"Service" means a consumable program offering in a cloud computing environment or other network or computing system environment.

"Cloud" means pooled resources for computing, storage, and networking which are elastically available for measured on-demand service. A cloud may be private, public, community, or a hybrid, and cloud services may be offered in the form of infrastructure as a service, platform as a service, software as a service, or another service. Unless stated otherwise, any discussion of reading from a file or writing to a file includes reading/writing a local file or reading/writing over a network, which may be a cloud network or other network, or doing both (local and networked read/write).

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as running a renderer, executing an extension, communicating between virtual machines, communicating over a network, automatically mapping file identifiers, and spawning processes are understood herein as inherently digital. A human mind cannot interface directly with a CPU or other processor, or with RAM or other digital storage, to read and write the necessary data to perform the extension environment configuring and remote extension execution steps taught herein, or to provide the expansion of extension binary usage availability taught herein. This would be well understood by persons of skill in the art in view of the present disclosure, but others may sometimes need to be informed or reminded of the facts. Unless stated otherwise, embodiments are also presumed to be capable of operating at scale (i.e., one thousand or more primary users) in production environments, or in testing labs for production environments, as opposed to being mere thought experiments.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accessing, caching, connecting, communicating, configuring, creating, displaying, executing, identifying, installing, interpreting, mapping, obtaining, operating, rendering, running, searching, saving, spawning, specifying, storing, synchronizing, using, utilizing (and accesses, accessed, caches, cached, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

Figure 4:
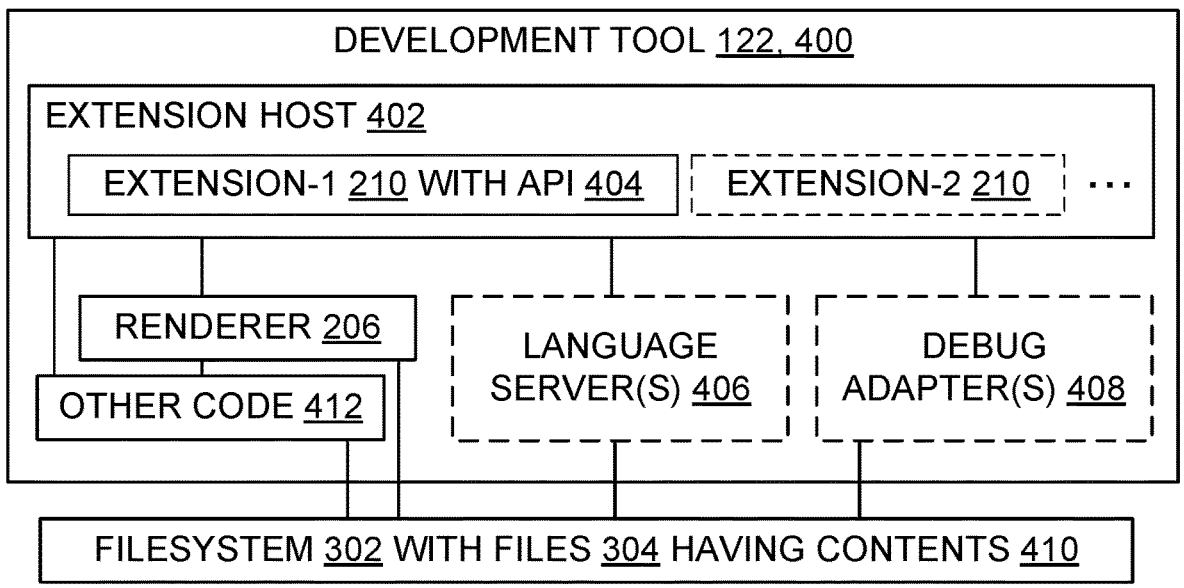
FIG. 4 is a block diagram illustrating aspects of a development tool according to some development tool architectures, including a user interface renderer, and also including one or more extensions in an extension host.

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as computational system or computing system
104 users
106 peripherals
108 network generally
110 processor
112 computer-readable storage medium, e.g., RAM, hard disks
114 removable configured computer-readable storage medium
116 instructions executable with processor; may be on removable storage media or in other memory (volatile or non-volatile or both)
118 data
120 kernel(s), e.g., operating system(s), BIOS, device drivers
122 tools, e.g., anti-virus software, firewalls, packet sniffer software, intrusion detection systems (IDS), intrusion prevention systems (IPS), software development tools and tool suites
124 applications, e.g., word processors, web browsers, spreadsheets, games, email tools
126 display screens, also referred to as "displays"
128 computing hardware not otherwise associated with a reference number 106, 108, 110, 112, 114
202 developer machine
204 extension machine
206 renderer portion of a software development tool; not to be confused with a rendering engine whose primary purpose is generating computer graphics, such as a ray tracing rendering engine or other image synthesis code which provides control over camera placement, light placement, shading, texture mapping, and other visual effects data; the renderer 206 renders a tool user interface typically used for viewing and editing source code text or similar file contents which is processed to produce executable software
208 non-volatile data store
210 extension to a software development tool; may also be referred to as a "plug-in"; includes binary or other executable code
212 record of communication between two machines, e.g., a data structure sent or received, or a sequence of procedure calls which pass information between the machines
302 filesystem, also sometimes referred to as "file system"; system software which controls how data is stored and retrieved
304 software development file, namely, a file containing data which is useful for software development
306 path associated with a file by a filesystem, typically includes at least a filename and names of one or more directories in a hierarchy of directories; the path is used to locate the file so its contents can be read or written
400 software development tool
402 software development tool extension host
404 software development tool extension API 406 programming language server, e.g., a Java language server, TypeScript server, Python server or other programming-language specific server 408 debug adapter, e.g., a Java language debug adapter or Python debug adapter or other programming-language-specific or debugger-specific or runtime-specific debug adapter 410 file contents 412 software development tool code not otherwise called out in FIG. 4; may include extension host communication agent, spawned processes, an additional extension host, or other code, for example 502 extension host communication agent 602 virtual machine 604 hypervisor 606 processor, memory, other hardware supporting virtual machine(s)

700 system configured with software development tool 802 file identifier

804 URI-based file identifier 806 filesystem path-based file identifier 808 uniform resource identifier ("URI")

810 scheme component of URI 812 path component of URI

814 IP address 816 port number 818 symbolic name 820 network socket identifier 822 filesystem directory name 824 filesystem filename 826 filesystem volume name; sometimes referred to as a drive name 828 keyword or other token which triggers the mapping of a URI file ID to a path file ID; may be referred to as "map trigger" or "mapping trigger"

830 authority component of URI 832 any component of a URI not otherwise numbered 902 processor core; a processor 110 may have one or more cores 904 storage capacity of a memory 112

906 cloud; may also be referred to as a "cloud network"

Figure 14:
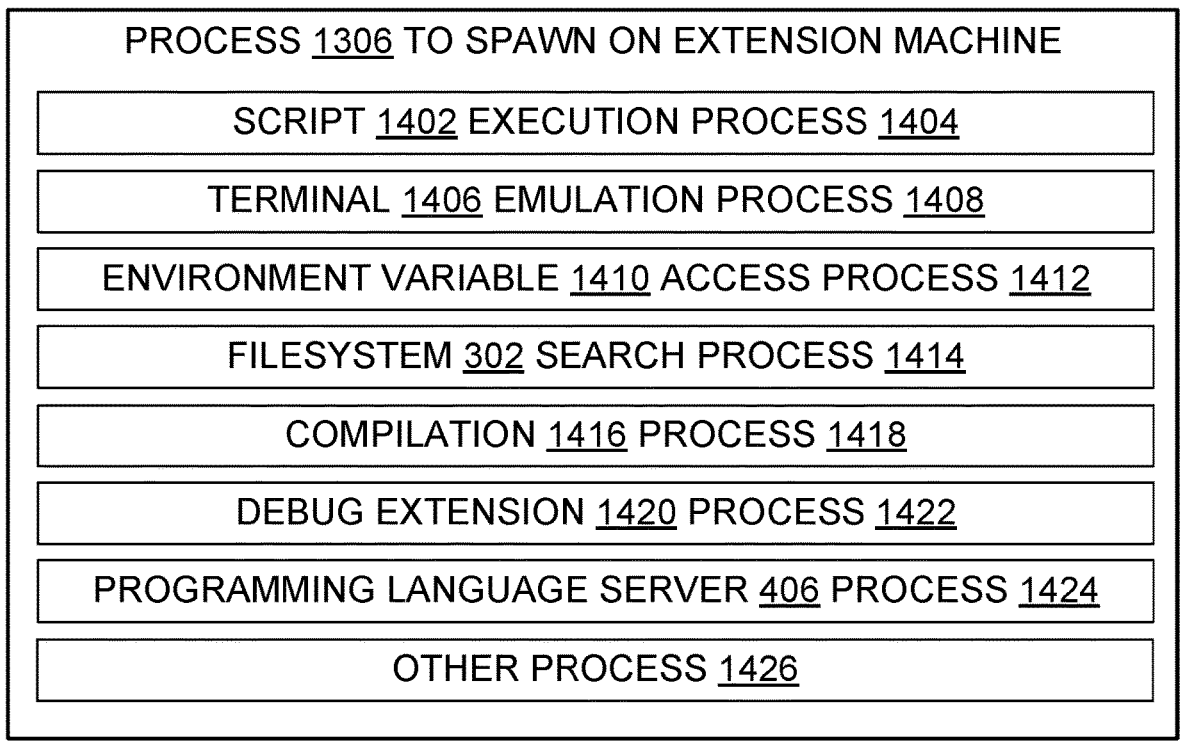
FIG. 14 is a block diagram illustrating processes which may be spawned for a development tool on an extension machine.

908 firewall; may be implemented entirely in software or may be a firewall hardware appliance, for example 910 container, namely, operating-system level or kernel-level virtualization; containers are typically isolated from each other, use their own set of libraries, and may communicate with one another; containers are typically deployed in a set with all containers using the same kernel and thus being more lightweight than virtual machines 912 UI extension, e.g., extension 210 which provides icons, coloring scheme, or other data or code to enhance a user's experience of interactions with a development tool 1002 compatibility layer 1102 security sandbox 1202 data model layer 1302 software development operation 1304 identifier of software development operation, e.g., command or opcode 1306 process, e.g., a software process which has a PID (a process identifier in a given kernel) and has a state such as ready, running, suspended, blocked, or the like 1308 process identifier for a process to be spawned; may be, e.g., a name or an ID number, but does not generally match the PID after the process is spawned, since PIDs are assigned by the kernel when the kernel creates processes, and the process identifier 1308 identifies processes which are generally not yet created by a kernel 1402 script 1404 process to execute a script; also refers to processes created by executing the script 1406 terminal, e.g., TTY or console 1408 process to emulate a terminal 1410 environment variable 1412 process which accesses (reads or writes or does both) an environment variable 1414 process which searches at least a portion of a filesystem 1416 compilation; also refers to compiler, linker, or other tool used to transform source code into executable form 1418 process with invokes a compiler or otherwise performs compilation, including any filenames, compiler options, preprocessing instructions, and other parameters to the compilation, and linking or other Makefile or project build operations 1420 debug extension 1422 process performed to assist debugging 1424 process which invokes, communicates with, or is performed by a programming language server 1426 any process not otherwise identified in FIG. 14

1500 method to configure a software development system to execute a development tool extension, or to execute the development tool extension, or both 1502 run a renderer 1504 connect developer machine and extension machine to permit communications between them 1506 at least partially execute a development tool extension 1508 identify a file using a URI file ID 1510 map a URI file to a path file ID identifying the same file 1512 access a file using a path file ID 1514 specify a process to spawn 1516 spawn a process; also refers to instructing code to spawn the process 1518 perform one or more software development operations on file contents 1520 install a development tool extension, e.g., plug it into an extension host 1600 flowchart 1602 close, lose or otherwise terminate a network connection 1604 interpret user input, e.g., perform command input by a user, or schedule its performance 1606 user input to a user interface 1608 cache data 1610 communicate with a development tool extension, either directly or indirectly (e.g., via agent and host)

1612 network or other communication latency 1614 obtain a network connection 1616 network or machine connection 1618 detect a connection to a particular network or a particular machine or both 1620 synchronize copies of a file 1622 upload data from a machine 1624 launch an extension host 1626 terminate an extension host 1628 provide transparent remote execution of a development tool extension 1630 use an extension host which resides in a cloud 1632 perform another step not otherwise specifically numbered but nonetheless described herein 1634 create a renderer process, i.e., run a renderer
1636 operate synchronously
1638 operate asynchronously
1640 use the same filesystem as another stated process or piece of code
1642 use a different filesystem than another stated process or piece of code Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, software developers, engineers, and end-users are each a particular type of user 104, although it is contemplated that most users will likely be software developers who are end-users of a development tool. Automated agents, scripts, playback software, and the like acting on behalf of one or more people may also be users 104, e.g., to facilitate testing a system 102, but end-users are people (not processes) unless clearly indicated otherwise. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory. Software processes may be users 104, but unless clearly indicated otherwise, end-users are human.

In some embodiments, the system includes multiple computers connected by a network 108. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Examples are provided herein to help illustrate aspects of the technology, but the examples given within this document do not describe all of the possible embodiments. Embodiments are not limited to the specific implementations, arrangements, displays, features, approaches, or scenarios provided herein. A given embodiment may include additional or different technical features, mechanisms, sequences, or data structures, for instance, and may otherwise depart from the examples provided herein.

Figure 2:
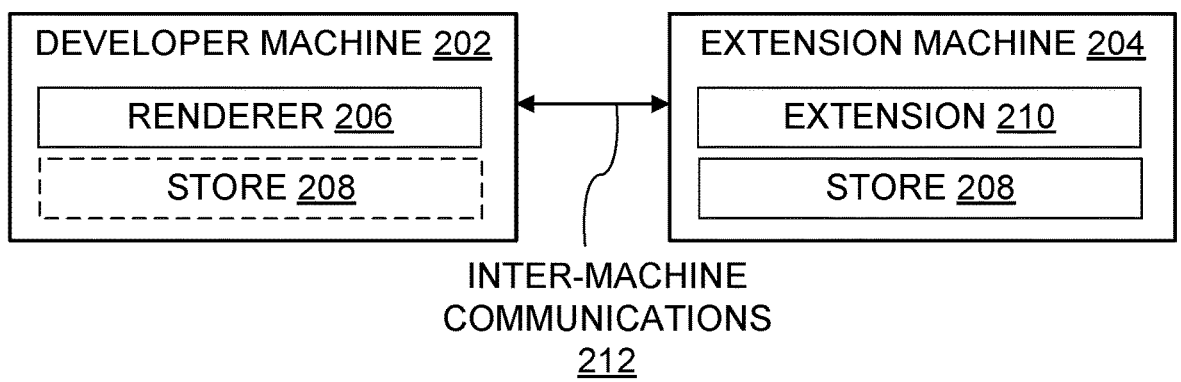
FIG. 2 is a block diagram illustrating aspects of a development tool system which includes a developer machine and an extension machine.
Figure 6:
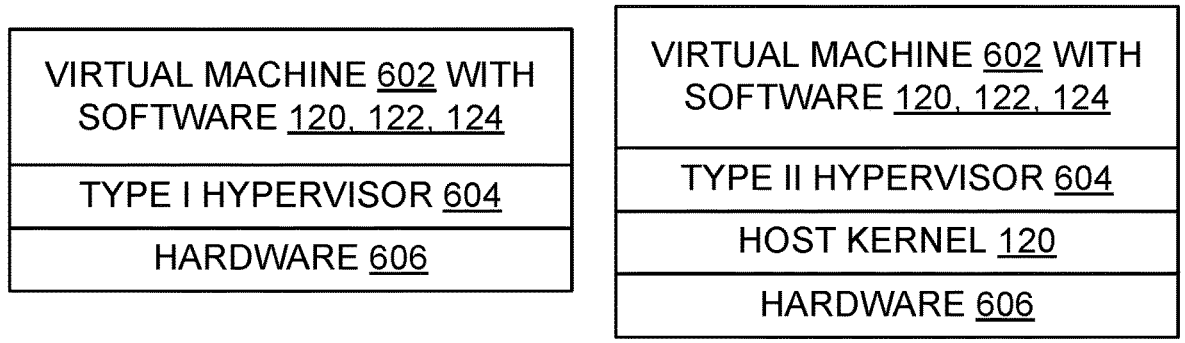
FIG. 6 is a diagram illustrating two operating environments for a virtual machine.
Figure 7:
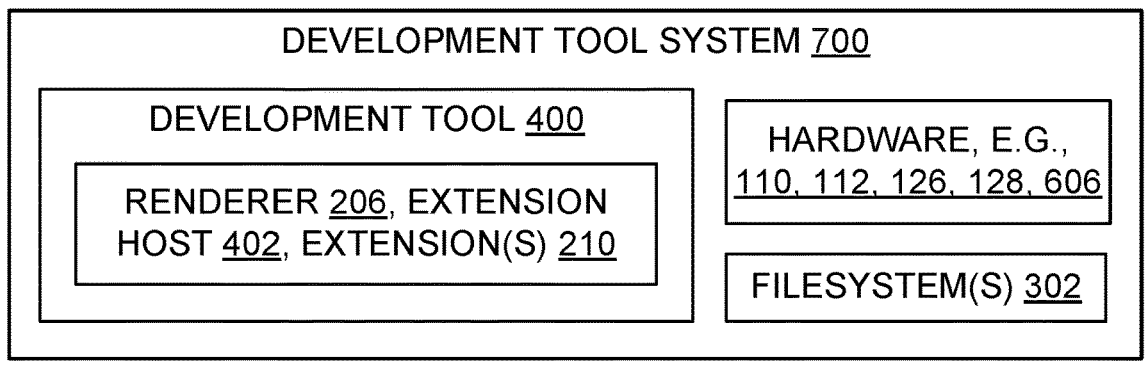
FIG. 7 is a block diagram illustrating aspects of a development tool system according to some development tool architectures, including a development tool, computing hardware, and one or more filesystems.
Figure 8:
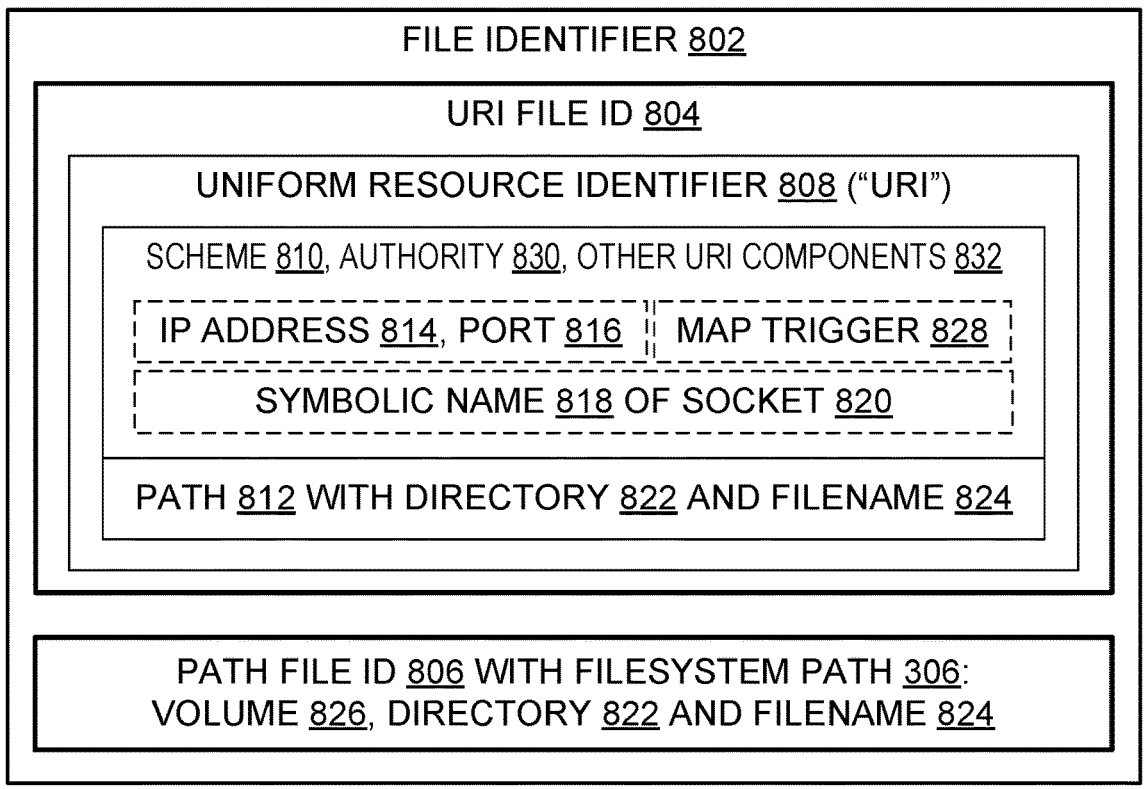
FIG. 8 is a block diagram illustrating aspects of some file identifiers.
Figure 9:
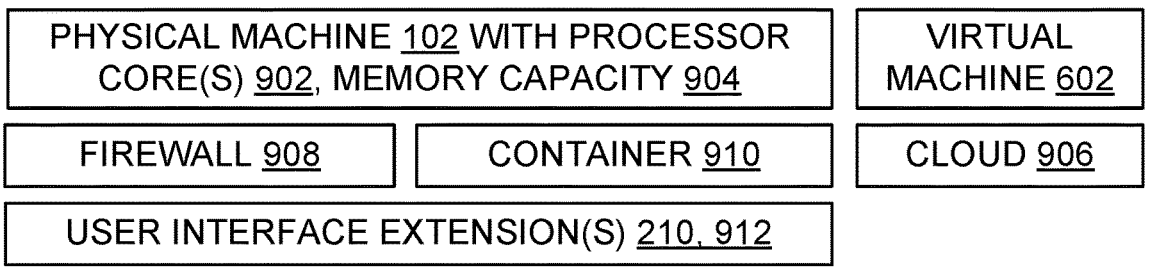
FIG. 9 is a block diagram illustrating aspects of deployment conditions, including one or more physical machines, one or more virtual machines, and a cloud.

With particular reference to FIGS. 2, 6 and 8, some systems include a developer machine 202, include an extension machine 204 in communication 212 with the developer machine, or include both machines. Each machine 202, 204 may be a physical machine, or it may be a virtual machine 602 running on underlying physical machine hardware 606 by way of at least a hypervisor 604. The hypervisor 604 may be a "bare metal" or type I hypervisor running directly on the hardware 606, or it may be a type II hypervisor which runs on a host operating system or another kernel that in turn runs directly on the hardware 606. Hardware 606 includes at least one processor 110 having one or more cores 902, and RAM or other working memory in operable communication with the processor(s) having a storage capacity 904. The physical machine(s) or virtual machine(s) may each be located in a cloud 906, or not.

Figure 3:
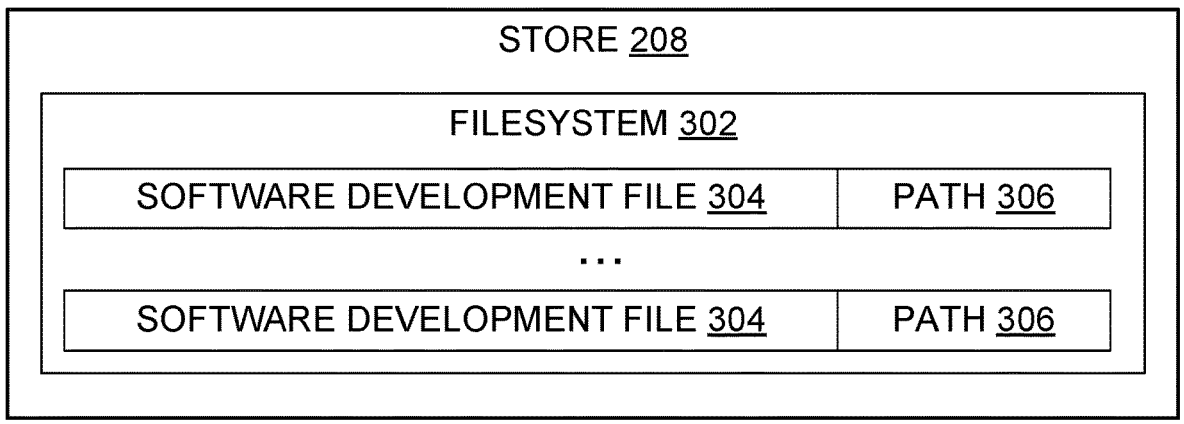
FIG. 3 is a block diagram illustrating a non-volatile store configured with a filesystem.

With particular reference to FIGS. 2 and 3, the extension machine 204 includes non-volatile digital storage in the form of a store 208. The developer machine may also have its own store 208. The store 208 is configured by a filesystem 302 which contains files 304, including software development files 304. Each file 304 in the filesystem 302 in the store 208 has a storage and retrieval location which is represented by a filesystem path 306.

As noted in FIG. 4, the files 304 contain contents 410. These contents 410 would typically include contents such as source code, binary code, software design documentation, and other data useful in developing software. However, one of skill facing the same challenges as the present inventors would focus their attention on technical areas such as tool deployment migration from a single-machine to a multi-machine implementation, and the selection of tool components and changes to permit their mutual disentanglement from an operating environment where they share a filesystem and share processes to an implementation that permits efficient and secure remote execution, and the continued availability of existing binaries in those contexts.

With particular reference to FIGS. 2, 4, 5 and 7, a development tool system 700 includes a development tool 400, computing hardware, and at least one filesystem 302 of files 304. The field of software development itself is not a field suitable for understanding the present innovations; it is far too broad. As illustrated, the development tool 400 includes a user interface portion, referred to here as the renderer 206, and also includes one or more hosted extensions 210. The extensions are hosted by an extension host 402 portion of the development tool 400.

Figure 5:
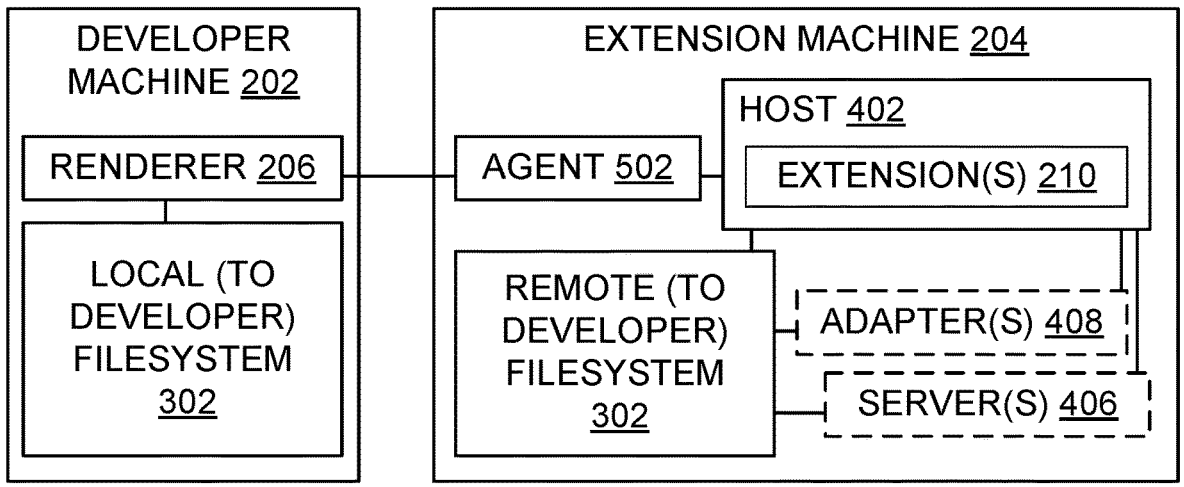
FIG. 5 is a block diagram illustrating aspects of a development tool system according to some development tool architectures which include a developer machine with a user interface renderer, and also include an extension machine with an agent and with one or more extensions in an extension host.

As indicated especially by FIGS. 2 and 5, the components of a development tool 400 may reside in two distinct machines. The machine with the renderer 206 is referred to as the developer machine because that is where the developer 104 interfaces directly with the development tool 400. The other machine(s) are each referred to as an extension machine 204 because the extension(s) 210 run on them. Thus, a filesystem on the developer machine 202 (if such a filesystem is present) may be considered a "local" filesystem because it is local to the developer, whereas the filesystem on the extension machine 204 may be considered a "remote" filesystem because it is remote from the developer.

As illustrated in FIGS. 4 and 5, a development tool 400 may include components in addition to the renderer, extension host(s), and extension(s). Additional components may include a communications agent 502, programming language server(s) 406, debug adapters(s) 408, and other code 412. The connection between the renderer 206 and the agent 502 may be a network 108 connection, and may use one or more familiar network communication protocols such as TCP/IP, UDP, HTTPS, and so on. Communication with a debug adapter 408 may utilize debug adapter protocol. Communication with a language server 406 may utilize language server protocol.

Figure 13:
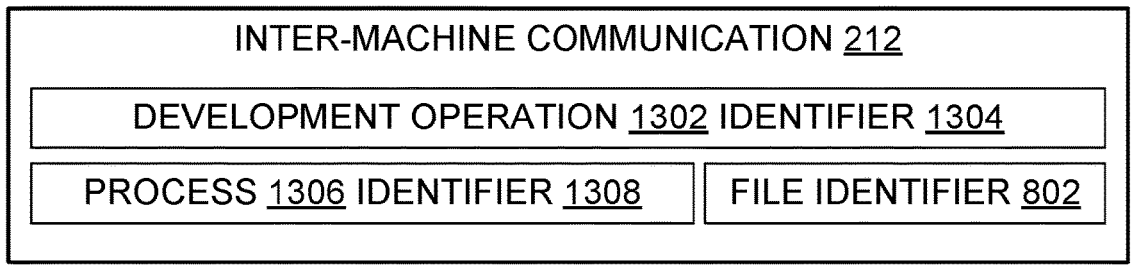
FIG. 13 is a block diagram illustrating aspects of inter-machine communication in a development tool system.

As indicated in FIG. 8, a particular file 304 may be identified by one or more file identifiers 802. One or more of these file identifiers may be used internally within the renderer 206 or an extension 210, and may be part of an inter-machine communication 212, as shown in FIG. 13. Two kinds of file identifiers 802 are shown in FIG. 8: URI file IDs 804 and path file IDs 806.

As suggested by the name, a URI file ID includes a uniform resource identifier (URI) 808. Each URI 808 includes components such as a URI scheme 810, a URI authority 830, and a URI path 812. The URI authority 830 may be embodied in an IP socket, namely, and IP address 814 with a port number 816. Alternately, the URI authority 830 may be embodied in a symbolic name 818 which resolves to a network socket 820. In other variations, the IP address or port may be encoded in other components 810, 832 of the URI 808. The URI path 812 includes at least one directory name 822 and a filename 824.

A path file ID 806 includes a filesystem path 306. The filesystem path 306 includes a volume identifier 826, at least one directory name 822, and a filename 824.

Figure 10:
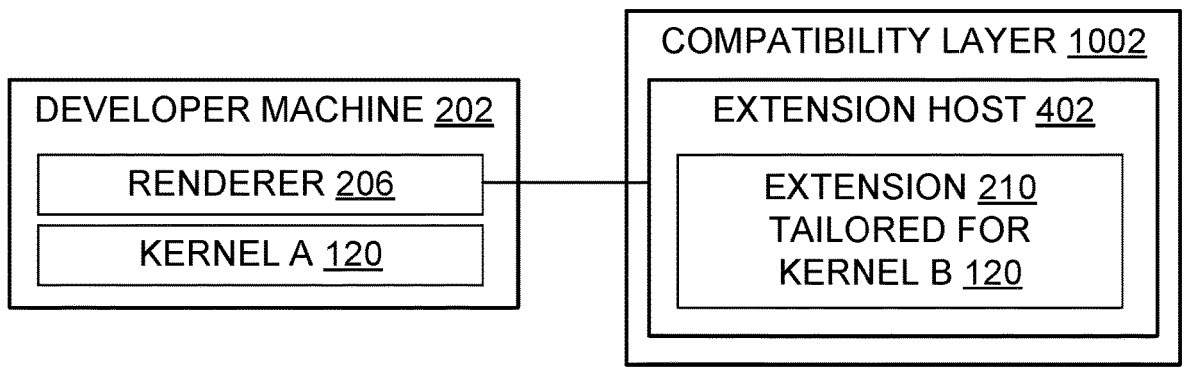
FIG. 10 is a block diagram illustrating aspects of a development tool system according to some development tool architectures, including a developer machine with one kind of kernel, and an extension that is tailored for another kind of kernel and is running in a compatibility layer.
Figure 11:
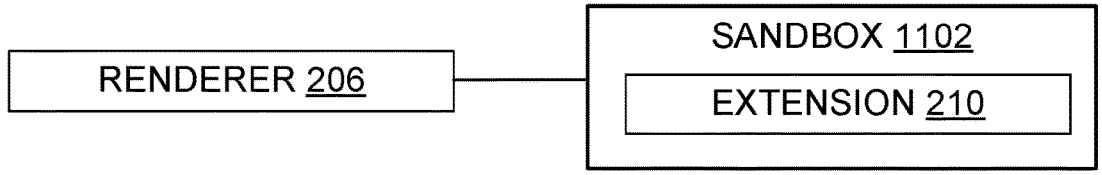
FIG. 11 is a block diagram illustrating aspects of a development tool system according to some development tool architectures, including an extension running in a sandbox.

As indicated in FIG. 10, an extension host 402 may run in a compatibility layer 1002. For example, in some embodiments the extension machine host or an entire virtual machine extension machine runs in Windows Subsystem for Linux (WSL). A WSL subsystem includes a compatibility layer 1002 which provides inter-operational compatibility between a Microsoft Windows operating system 120 and a Linux® operating system 120 (mark of Linus Torvalds). One embodiment includes a developer machine 202 which is a physical machine and an extension machine 204 which is or includes a Docker® container or a WSL subsystem (mark of Docker, Inc.).

As indicated in FIG. 10, an extension 210, an extension host 402, or an entire virtual machine extension machine 204 may run inside a security sandbox 1102. The sandbox provides an isolated code execution environment, from which only tightly controlled and carefully scrutinized data emerges. Network 108 access, the ability to inspect the extension machine 204, the ability to read from peripheral devices 106, and other data paths are all disallowed or heavily restricted by the sandbox 1102.

Figure 12:
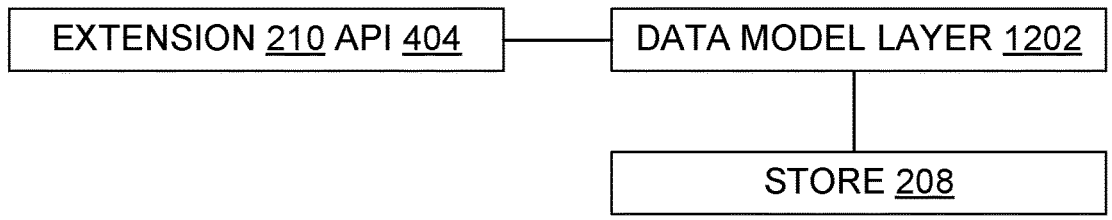
FIG. 12 is a block diagram illustrating aspects of a development tool system according to some development tool architectures, including an extension application program interface which accesses a store through a data model layer.

As indicated in FIG. 12, an extension 210 may communicate with the store 208 through an API 404, and in particular the API may communicate directly with a data model layer 1202, which is sometimes referred to as a data access layer 1202. Layer 1202 interjects an abstraction level. For example, the extension API 404 and layer 1202 may abstract painting calls by operating on completion items in the API, instead of lower-level items such as pixels or specific calls to paint pixels which have a pixel type as a parameter.

As shown in FIG. 13, inter-machine communications 212 may include a file identifier 802 and an identifier 1304 which identifies a development operation 1302 such as opening a file, closing a file, submitting a file to a compiler, launching code of an executable file, obtaining version information or other metadata about a file, and so on. Inter-machine communications 212 may alternatively or also include an identifier 1308 which identifies a process 1306 to be spawned on the extension machine 204, with a development operation identifier 1304 such as "spawn process" or a numeric indicator thereof. A communication 212 could also command that a process 1306 be suspended, forked, terminated, or otherwise subject to state change, using a corresponding operation identifier 1304.

FIG. 14 illustrates processes 1306 that could be spawned or otherwise subject to creation, termination, or other state change. These processes 1306 may be characterized as one or more of the following: a process 1404 to execute a script 1402, a process 1408 to emulate a terminal 1406 (typically a virtual terminal), a process 1412 which accesses an environment variable 1410, a process 1414 which searches a filesystem, a process 1418 which invokes compilation 1416, a process which uses a debug extension 1420 (e.g., to spawn a debugger process or debuggee process), or a process 1424 which launches a programming language server 406. Other processes 1426 on the extension machine 204 may also be controlled through the renderer 206 on the developer machine 202.

Some embodiments provide or use an extension machine 204 that is suitable for use in a development tool system 700 and configured to interoperate with a development tool extension ("extension") 210 which upon execution performs software development operations 1302 on file contents 410. The extension machine includes a processor 110, and a memory 112 in operable communication with the processor. This extension machine also includes an extension host agent ("agent") 502 which upon execution with the processor communicates with a development tool user interface renderer ("renderer") 206 that resides on a developer machine 202 external to the extension machine. This extension machine also includes an extension host ("host") 402 which is configured for operable communication with the agent and with the extension and with a store 208. The store 208 has a filesystem 302 containing software development files ("files") 304. Multiple files in the store are identified in at least one place outside the extension machine by respective uniform resource identifiers ("URI") file IDs 804, and those URI file IDs get mapped to filesystem paths 306 for use in the extension to identify the files in order to obtain the file contents 410. Some embodiments also include the extension 210 itself.

In some embodiments, at least one of the following deployment conditions is satisfied: the developer machine is a physical machine 102, and the extension machine is a different physical machine 102 than the developer machine; the developer machine is a physical machine, the extension machine is a different physical machine than the developer machine, and the extension machine processor 110 is faster than any processor of the developer machine; the developer machine is a physical machine, the extension machine is a different physical machine than the developer machine, and the extension machine has more processor cores 902 than the developer machine; the developer machine is a physical machine, the extension machine is a different physical machine than the developer machine, and the extension machine memory has more random access memory capacity 904 than any memory of the developer machine; the developer machine is a virtual machine 602, and the extension machine is a different virtual machine 602 than the developer machine; the developer machine and the extension machine are each a respective virtual machine, and both of these virtual machines are running on one and the same physical machine.

In some embodiments, at least one of the following mapping conditions is satisfied: the agent 502 maps the URI file IDs 804 to respective filesystem paths 306 for use by the extension to identify the files to obtain the file contents; the host 402 maps the URI file IDs 804 to respective filesystem paths 306 for use by the extension to identify the files to obtain the file contents.

In some embodiments, at least one of the following URI format conditions is satisfied by at least one URI file ID 804 which gets mapped to a filesystem path 306 used by the extension: a URI 808 in the URI file ID includes an IP address 814 of the extension machine and a port 816 of the extension machine; a URI 808 in the URI file ID includes a symbolic name 818 which is resolvable to a network socket 820 of the extension machine.

In some embodiments, the extension 210 runs in a compatibility layer 1002. The compatibility layer is configured to provide functional compatibility between two operating systems 120 of different kinds.

In some embodiments, the extension machine 204 and the developer machine 202 are located on different respective sides of a firewall 908. Thus, the firewall is configured to allow inter-machine communications 212 to pass through the firewall, to allow communication between the machines 202 and 204.

In some embodiments, the extension 210 runs in a security sandbox 1102 and the renderer 206 is located outside the sandbox. A firewall 908 may be part of the security sandbox 1102, but the security sandbox 1102 goes beyond merely firewalling network traffic. The security sandbox 1102 also inhibits access to extension machine 204 memory, e.g., to environment variables 1410 and to operating system 120 data structures and to any applications 124 (other than the development tool if it is viewed as an application) that may be running on the extension machine 204. Some security sandboxes 1102 include data-loss-prevention software.

In some embodiments, at least one of the following synchronization conditions is satisfied: the extension 210 includes an extension application program interface ("API")

404 which is configured to operate synchronously when reading and asynchronously when writing; the extension 210 includes an extension API 404 which is configured to read and write through a data model layer 1202; the host 402 is configured to execute independently of the renderer 206. In some embodiments, both reading and writing operate asynchronously.

Some embodiments provide or use a developer machine 202 that is suitable for use in a development tool system 700 and configured to interoperate with a development tool extension ("extension") 210 which upon execution performs software development operations 1302 on file contents 410. The developer machine includes a processor 110, and a memory 112 in operable communication with the processor. This developer machine also includes a development tool user interface renderer ("renderer") 206 which upon execution with the processor communicates with the extension by sending and receiving inter-machine communications 212. Some of these communications 212 identify one or more of the software development operations 1302. The extension 210 resides on an extension machine 204 that is external to the developer machine. The renderer is configured to use uniform resource identifiers ("URIs") 808 to identify files 304 in a filesystem 302 in a store 208 on the extension machine 204. The renderer 206 is further configured to specify in one or more of the inter-machine communications 212 one or more development processes 1306 to be spawned on the extension machine instead of the renderer spawning those development processes on the developer machine.

In some embodiments, the renderer 206 is configured to specify, in one or more of the inter-machine communications 212, one or more of the following development processes 1306 to be spawned on the extension machine: execution of a script 1402 on the extension machine; a terminal emulation 1408; a filesystem search process 1414; a process 1412 which accesses an environment variable of the extension machine; a process 1418 that compiles source code into binary form which is tailored for execution on the extension machine; a debug extension process 1422; a programming language server process 1424; one or more other processes 1426, e.g., a static analysis tool.

Some embodiments include the developer machine 202 in combination with the extension machine 204. In some of these, the extension machine includes an extension machine processor 110 and an extension machine memory 112 in operable communication with the extension machine processor. This extension machine also includes an extension host agent ("agent") 502 which upon execution with the extension machine processor communicates with the renderer, and an extension host ("host") 402 which is configured for operable communication with the agent 502 and with the extension 210 and with the extension machine's store 208.

Other system embodiments are also described herein, either directly or derivable as system versions of described methods or configured media, informed by the extension discussion herein of computing hardware.

Methods

Figure 15:
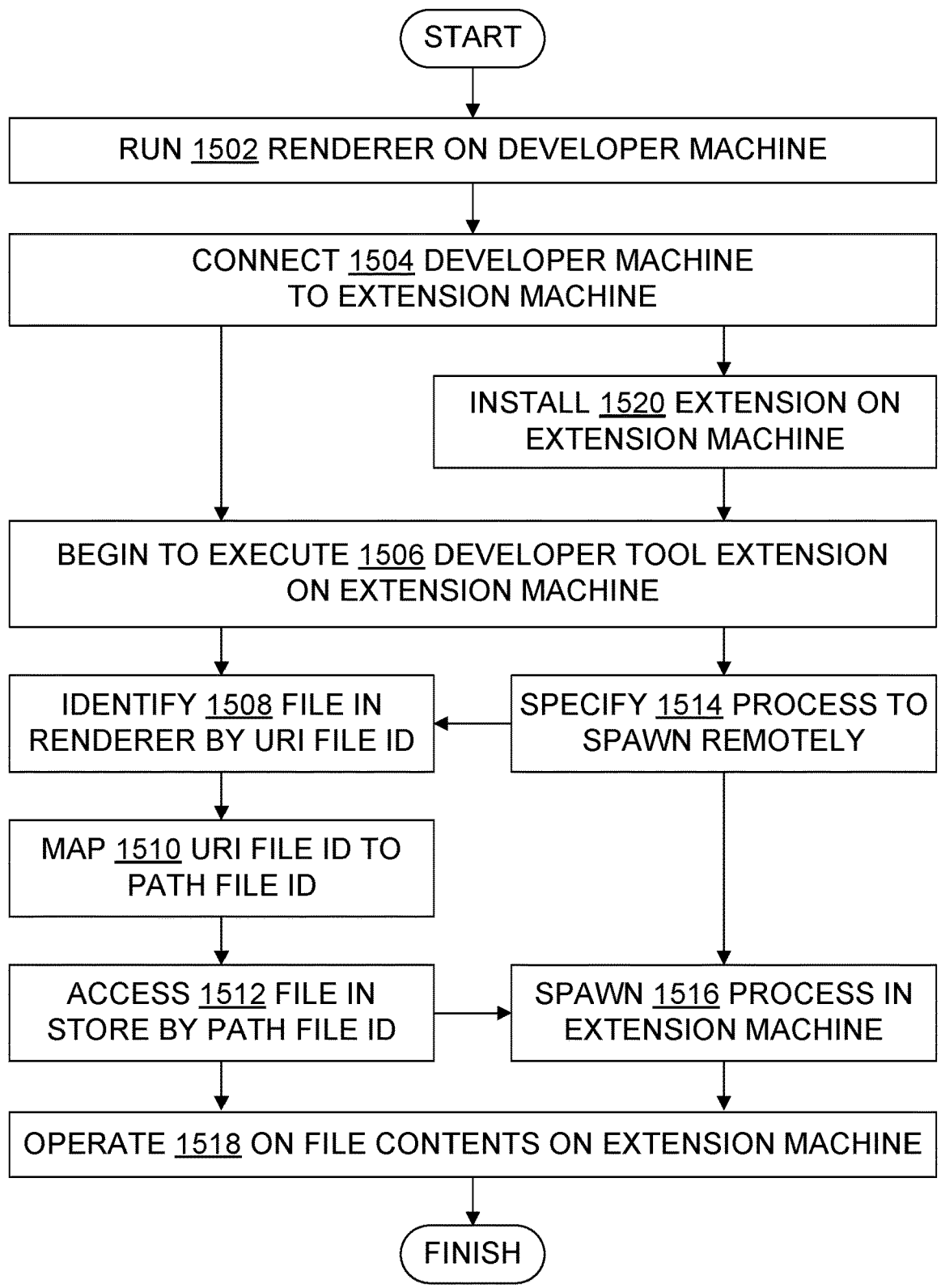
FIG. 15 is a flowchart illustrating some example extension execution methods.
Figure 16:
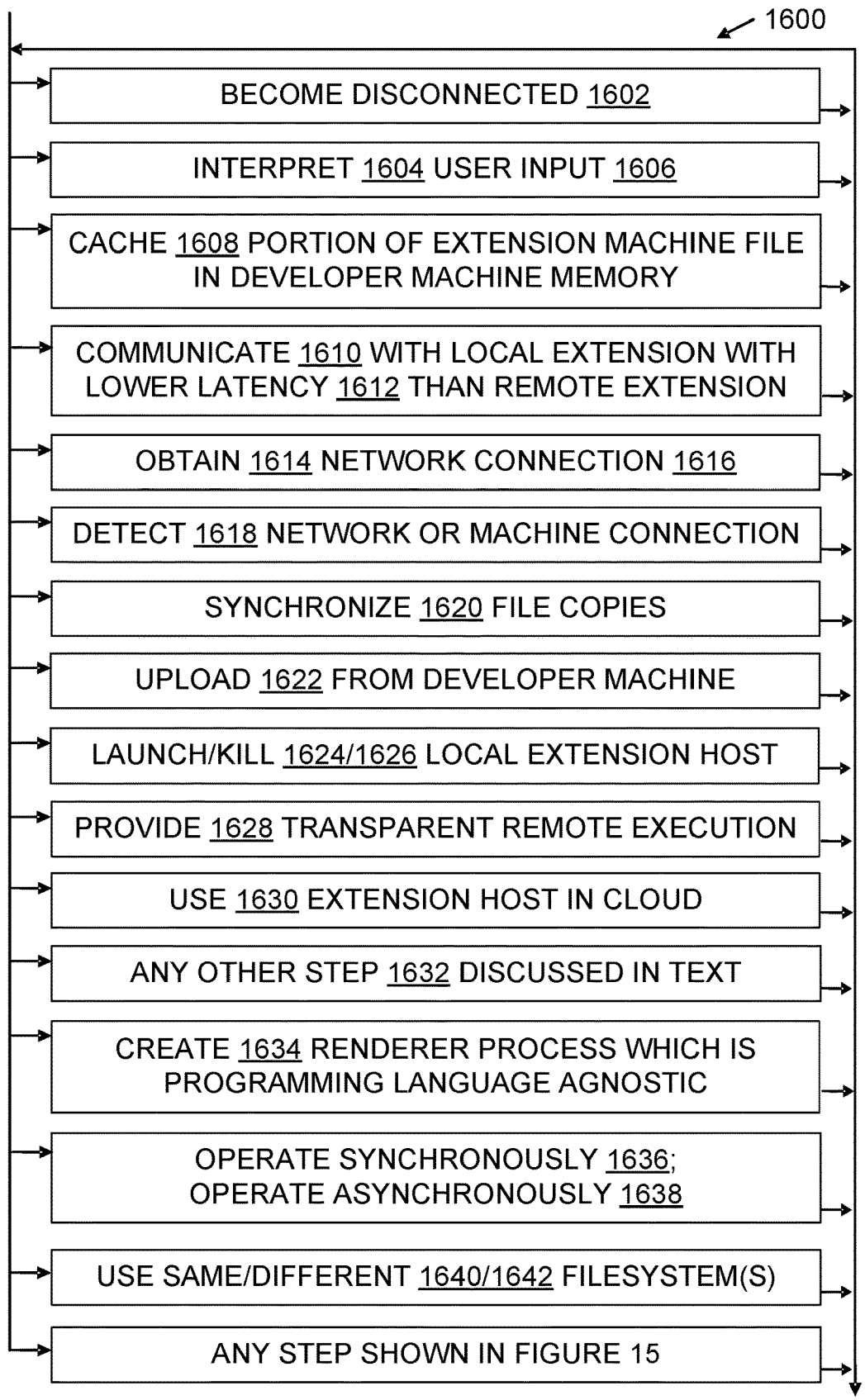
FIG. 16 is a flowchart further illustrating steps in some development tool configuration or usage methods.

With particular reference to FIGS. 15 and 16, some embodiments provide or use a method for executing a development tool extension ("extension") 210 to perform software development operations 1302 on file contents 410. One method includes running 1502 a development tool user interface renderer ("renderer") on a developer machine, connecting 1504 the developer machine to an extension machine for inter-machine communications, and executing 1506 the extension on the extension machine. In some cases, connecting the developer machine to the extension machine includes obtaining 1614 a network connection 1616. The extension machine has a store which is configured by a filesystem containing software development files. This method also includes identifying 1508 at least one of the software development files in the renderer using a uniform resource identifier file identification ("URI file ID"), and automatically mapping 1510 the URI file ID into a filesystem path file identification ("path file ID") of the software development file. This method also includes accessing 1512 the software development file in the store using the path file ID, and operating 1518 on file contents of the accessed software development file in the extension. In some methods, mapping 1510 the URI file ID into the path file ID occurs in the renderer.

In some embodiments, the method provides 1628 transparent remote execution of the development tool extension in at least one of the following ways: the extension operates 1518 equally on the file contents regardless of whether the developer machine and the extension machine share the same filesystem or have separate respective filesystems; the extension operates 1518 equally on the file contents regardless of whether the renderer and the extension are running on the same physical machine or on separate respective physical machines.

In some embodiments, the developer machine and the extension machine become disconnected 1602 after being connected. The method further includes the renderer interpreting 1604 user input 1606 while the machines are not connected.

Some methods include caching 1608 in the developer machine 202 a copy of at least part of a software development file 304 which is stored in the filesystem in the store on the extension machine 204.

In some embodiments, the extension is a first development tool extension ("first extension"), and the renderer communicates with the first extension by communications 212 which are subject to a first latency level 1612, and the method further includes running a second development tool extension ("second extension") on a machine which is not the same extension machine running the first extension. The renderer communicates with the second extension by communications 212 which are subject to a second latency level which is less than the first latency level. For example, communications which do not identify extension machine files can be restricted to the developer machine, thereby allowing the system 700 to process them faster than if they went over the network to the extension machine. More generally, a renderer 206 may connect concurrently to N distinct extension machines 204, and each connection may have a respective latency. For instance, a distributed filesystem could be mapped to N different machines for better performance. The user could employ N different tool extensions 210 on the respective extension machines, to execute independently of one another.

Some embodiments automatically synchronize 1620 copies of at least one of the software development files in response to detecting 1618 which network or which other machine, if any, the developer machine is connected to over a network connection.

Technical methods shown in the Figures or otherwise disclosed will be performed automatically, e.g., by a text editor process executing on a computer system, unless otherwise indicated. Methods may also be performed in part automatically and in part manually to the extent action by a human administrator or other human person is implicated, e.g., by inputting a filename or a command or both to the renderer. No method contemplated as innovative herein is entirely manual. In a given embodiment zero or more illustrated steps of a method may be repeated, perhaps with different parameters or data to operate on. Steps in an embodiment may also be done in a different order than the top-to-bottom order that is laid out in FIGS. 15 and 16. Steps may be performed serially, in a partially overlapping manner, or fully in parallel. In particular, the order in which flowchart 1500 or flowchart 1600 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as communications 212, agent 502, and URI file IDs 804, in the form of data 118 and instructions 116, read from a removable storage medium 114 and/or another source such as a network connection, to form a configured storage medium. The configured storage medium 112 is capable of causing a computer system to perform technical process steps for transparent remote execution of development tool extensions 210, as disclosed herein. The Figures thus help illustrate configured storage media embodiments and process embodiments, as well as system and process embodiments. In particular, any of the process steps illustrated in FIG. 15 or 16, or otherwise taught herein, may be used to help configure a storage medium to form a configured storage medium embodiment.

Visual Studio® Code Example

The following discussion is derived from a description of how a remote execution tool architecture, data structures and associated algorithms were created for a software development tool known as Visual Studio® Code (mark of Microsoft Corporation). "Visual Studio® Code" is abbreviated herein as "VS Code". One of skill will recognize in this discussion many teachings which are also described elsewhere herein and which either appear in patent claims or could be claimed. However, as with the other code-specific examples provided herein, it does not follow that every part of this discussion, or any particular details therein, are required to satisfy legal criteria such as enablement, written description, or best mode. Also, embodiments are not limited to the particular programming languages, tool contexts, identifiers, fields, class definitions, or other implementation choices described in this discussion or elsewhere herein.

VS Code is a development tool 122 that uses a multi-process architecture on a single machine. Upon opening a new graphical user interface window in a version of the VS Code tool, a renderer process is created; to distinguish it from the renderer 206, this renderer process is also referred to herein as "RP". In some implementations, the renderer process RP is labeled as "window (hover.ts—vscode)", as shown in the example process tree below. The renderer process RP is responsible for rendering the user interface ("UI"), handling user input, reading or writing files to disk, and other interactive features. One feature the renderer process RP manages is file watching, which leads to the creation of a watcherService process. The renderer process RP is programming language agnostic. Accordingly, all programming language support is built as VS Code extensions 210. The renderer process RP spawns an extension host process (labeled in some implementations as "extensionHost") and it loads extensions inside this process. This extension host is referred herein as "EH" to help distinguish it from extension host 402. The extensions 210 themselves can also spawn additional processes if they wish to do so, e.g., tsserver, tslintServer, and jsonServerMain are processes spawned by extensions 210 themselves.

A typical process tree for opening a TypeScript project in a VS Code tool resembles the following:

| CPU % | Mem MB | PID | Process |
|---|---|---|---|
| 13 | 49 | 41094 | code-insiders main |
| 0 | 33 | 41095 | gpu-process |
| 0 | 33 | 41101 | shared-process |
| 0 | 98 | 42234 | window (hover.ts - vscode) |
| 0 | 33 | 42237 | extensionHost |
| 0 | 475 | 42240 | electron_node electronForkStart.js tssserver.js |
| 0 | 16 | 42252 | electron_node typingsInstaller.js tsserver.js typeMap.js |
| 0 | 16 | 42241 | electron_node tslintServer.js |
| 0 | 16 | 42270 | electron_node jsonServerMain.js |
| 0 | 16 | 42238 | watcherService |

This VS Code multi-process single machine architecture works because all the processes involved share the same filesystem. That is, the familiar VS Code architecture resembles the architecture shown in FIG. 4, but with some changes: the extension host 402 is replaced by EH, and the renderer 206 is replaced by RP. Communication between RP and EH includes remote procedure calls. The scope delimited in FIG. 4 by the outer rectangle for tool 122 could be a machine or a container, under either approach (the EH-RP approach or the extension host 402 and renderer 206 approach).

As mentioned, in the VS Code multi-process single machine architecture all of the involved processes have access to the same filesystem. When opening a folder in the UI, for example "C:\Projects\example", this information is communicated to EH and by an EH API to individual extensions 210. That is how a Java Language Server 406 knows, for example, which project is opened in the UI, so it does not scan the entire filesystem for ".java" files to provide identifier auto-completion or other development support features.

In the VS Code multi-process single machine architecture, the EH process works by assuming that RP holds authoritative information about files and spawned processes. For example, when opening a file 304, the file is read from disk by RP. The contents 410 of the buffer are sent from RP over to EH through an EH Remote Procedure Call (RPC). When the user 104 types in the RP buffer, RP immediately accepts the keypresses and proceeds to modify its buffer and to paint its new contents on the screen 126. A message is dispatched to EH to inform it that the buffer has been modified, but RP does not wait for that message to be acknowledged. Typing is continuously possible, even if EH is unresponsive or has crashed.

In some implementations, extensions 210 are built on a "vscode" API which operates such that all reading APIs are synchronous and all editing, modifying, or other writing APIs are asynchronous. So, for example, an entire copy of a buffer is made available to extensions 210 in EH. Extensions 210 can execute without any additional communication with RP, at least for all the reading APIs, e.g., to read a line of content from the RP buffer at a certain position. The writing APIs are asynchronous because the authentic information for this implementation of the VS Code tool lives with RP, and an acknowledgement from RP is relied upon. For example, an extension 210 may wish to edit the text buffer after seeing the buffer at a certain version N. EH dispatches a message to RP to ask it that RP apply the edit. But since EH and RP are separate processes, RP might have accepted user input in the meantime. In this case, when processing the user input, RP advances the text buffer version to N+1. By the time the editing message arrives from EH, the text buffer has been already modified. This is recognized by RP and the edit is rejected. This rejection is communicated back to EH. Then the edits done by the user are sent to EH to bring its buffer version to N+1; edits may be in the form of a delta. Thus, extensions 210 in this VS Code example run independently of RP and vice-versa.

Now consider embodiments in which RP is replaced by renderer 206 and EH is replaced by one or more extension hosts 402, in which functionalities are divided between two machines, and in which the renderer 206 and at least one extension host 402 do not share the filesystem. This embodiment may still provide a version of the VS Code tool, but said version is a multi-machine version, with different or additional functionalities taught herein relative to the RP-EH version discussed above. In particular, transparent remote extension hosting becomes possible in a multi-machine architecture.

One aspect of some embodiments is that a renderer process 206 and an extension host process 402 can be executed on different machines (developer machine 202 and extension machine 204, respectively), with different respective filesystems 302. This may be accomplished, for example, either by coding a renderer 206 and a host 402 from scratch, or else by making modifications to the renderer process RP, making modifications to the extension host EH, and introducing an extension host agent 502. Regardless, it is possible to run 1506 the exact same existing VS Code extensions 210, without any modifications to them. The extensions 210 are typically not aware which architecture (single machine or multi-machine) they are being executed in.

FIG. 5 illustrates some innovative embodiments according to a multi-machine development tool architecture. This architecture includes a machine 202 where the UI is running; this is called the "local machine" or "developer machine". This architecture also includes a machine 204 where the extension host is running, called the "remote machine" or "extension machine".

One reason for making modifications to the single-machine RP EH approach, or for crafting similarly function new code, when implementing a multi-machine development tool extension architecture, is that existing extensions 210 assume that the files 304 they are working on are available locally and can be accessed using a standard filesystem API 302. The assumption of local access to files is hard-coded in extension 210 binaries. To be able to reuse these existing extension binaries, in the innovative architecture the extension host 402 and the extensions 210 themselves run on the machine 204 that is providing the filesystem 302.

By contrast, the RP renderer process accesses resources using URIs 808. One alternative multi-machine architecture would therefore have copied the remote machine directory structure to the local machine, had the renderer access files in that copied directory structure just as the RP did in the single-machine architecture, and then mirrored those filesystem accesses across to the remote machine's filesystem. This approach would have reduced the modifications to the RP to form the renderer 206 relative to the FIG. 5 architecture.

FIG. 5 illustrates a different approach to multi-machine development tool implementation. Instead of accessing file resources using a normal file URI, the renderer 206 uses a URI file ID 804, such as a file identifier 802 with a special vscode-remote URI, in order to access files 304. The VS Code agent 502 allows the extension host 402 to operate as if it were communicating with a local renderer on the same machine 204 as the host, and the renderer 206 operates as if it were communicating with a local extension host on the same machine 202 as the renderer, as described herein.

As to process spawning, one renderer 206 created by modifying VS Code RP will no longer spawn an extension host process. Instead, it will connect to an extension host agent 502 running on a different machine. In this particular implementation, this code path is triggered by opening a folder with a special URI authority 830, e.g., in a URI file ID:

vscode-remote://10.211.55.6:8000/C%3A/Alex/src/working_dir

In this example, "10.211.55.6" is an IP address 814, "8000" is a port number 816, "10.211.55.6:8000" is an authority 830, "vscode-remote" is a scheme 810 and a mapping trigger 828, "C%3A" is a volume identifier 826, "Alex" and "src" and "working_dir" are directory names 822, and "/C%3A/Alex/src/working_dir" is a URI-encoded filesystem path 306 which represents the decoded path and folder C:\Alex\src\working_dir (although it may appear there is no filename at the end of the path, a directory is actually a particular kind of file). Neither the IP address nor the URI in this example is intended to operate as a live hyperlink, and there is no intention to incorporate by reference any information into the present disclosure document. The presence of the mapping trigger 828 will trigger a code path in which the renderer process 206 will connect 1504 to the IP address and port indicated in the URI and begin communicating with the extension host agent 502. In some alternative embodiments, including for instance some using a compatibility layer such as WSL, URIs may have a form such as "vscode-remote://127.0.0.1:wsl/ . . . " or a form such as "vscode-remote://wsl:ubunti1804/ . . . " for example. A URI may encode, in its authority component 830 or otherwise, a symbolic name of a compatibility layer distribution to use, or an indication to use WSL or some other specific compatibility layer technology.

This architecture is suitable for situations, for example, in which the project being developed lives in the remote filesystem, and that filesystem is disconnected from the local filesystem. However, the architecture may also be used in other scenarios, such as scenarios in which two filesystems are mapped to the same storage devices. Such filesystem mapping may occur, e.g., when using Windows® Subsystem for Linux®, Docker® software or other volume mapping functionality, or network file sharing (Windows is a mark of Microsoft Corporation, Linux is a mark of Linus Torvalds, and Docker is a mark of Docker, Inc.).

When opening a file 304, the renderer process 206 does not have direct access to the remote filesystem. If the tool tried to use the path "C:\Alex\src\working_dir" in the renderer process 206, then that path would be looked up in the local filesystem on the developer machine, which does not contain it. Thus, some embodiments use URIs and URI mapping as a technique to make remote tool extension execution work as desired.

As an example, assume the project lives in the remote machine 204 at location "C:\Alex\src\working_dir". Then the extension host 402 on that machine will call the location "file:///C%3A/Alex/src/working_dir", which is a path file ID not a URI file ID. The VS Code API in the extension host 402 will refer to this file as a local file using the path file ID, such that all extensions 210 can read this file directly. But the renderer process 206 will refer to this same file using a URI file ID as "vscode-remote://10.211.55.6:8000/C%3A/Alex/src/working_dir". This implementation illustrates the following URI mapping 1510 technique:

Files living on the remote machine filesystem:
Use the file:// scheme on the remote machine
Use the vscode-remote:// scheme on the local machine
Files living on the local machine filesystem:
Use the file:// scheme on the local machine
Use the vscode-local:// scheme on the local machine As noted earlier, embodiments are not limited to the particular identifiers "vscode-local" and "vscode-remote" used in this example; different implementations may use different names as mapping triggers. Mapping could also be done using authority changes. This mapping file identifier may be implemented in remote extension host code in some examples. In some cases, mapping is handled automatically for all messages 212 passing between the renderer 206 and the extension host 402. Thus, when opening a file from "vscode-remote:// 10.211.55.6:8000/C%3A/Alex/src/working_dir/file.txt" a sequence of actions performed may include the following, reflecting mapping 1510 which is done in the agent 502:
1. The renderer sends a message 212 which asks for contents of "vscode-remote://10.211.55.6:8000/C%3A/Alex/src/working_dir/file.txt".
2. The extension host receives a corresponding request for contents of "file:///C%3A/Alex/src/working_dir/file.txt".
3. The extension host sends the requested contents to the renderer.
4. The renderer sends a message 212 which states that the file "vscode-remote://10.211.55.6:8000/C%3A/Alex/src/working_dir/file.txt" is opened.
5. The extension host receives a notice that this file has been opened: "file:///C%3A/Alex/src/working_dir/file.txt".

In short, in this example the renderer process 206 knows that "vscode-remote" files are to be handled specially, so it will post a request to the remote extension host to fetch the contents of the file. Once the renderer 206 receives the complete file contents, it will allocate a text buffer. Then the renderer 206 will permanently refer to the file (in this implementation) as "vscode-remote://10.211.55.6:8000/C%3A/Alex/src/working_dir/file.txt". The renderer process 206 sends a message to the extension host process 402 to let it know that the file "vscode-remote://10.211.55.6:8000/C%3A/Alex/src/working_dir/file.txt" is now opened in the UI; the message also contains the contents of the buffer in memory. The URI mapping is performed, and the extension host process receives the message that the file "file:///C%3A/Alex/src/working_dir/file.txt" is now opened in the UI. As a result of the mapping, so far as the extensions 210 are concerned the renderer process 206 could have been running locally and it would appear to the extensions 210 to behave in the same way as it did when RP ran locally.

In summary, in this implementation the VS Code Extension Agent 502 makes the extension host 402 and the running extension 210 on a remote machine 204 think that the renderer 206 is running locally with them and sharing the same storage resources. This is true for the other direction as well, in that by operation of the VS Code Extension Agent 502 most of the renderer process 206 thinks that the extension host 402 and extension 210 are running locally on machine 202. The exception is the renderer code that detects and processes the mapping trigger 828. As noted elsewhere, the agent 502 is not the only code that could be primarily responsible for mapping 1510. Mapping between URI file IDs and path file IDs could also, or instead, be done in renderer 206 code or extension host 402 code, or multiple places, in other implementations.

Resource files 304 shipped by extensions 210 may be handled in a similar manner. For example, extensions 210 can ship grammar files describing how a source file is colored in an editor based on programming language syntax, theme files defining the particular colors that should be used for coloring, icon files, and so on. This information may be made available in the renderer process 206, e.g., through the UI a user may be able to change their theme and pick a theme that is contributed by a remote extension 210. In this case, the tool 400 will fetch the selected theme file from the remote extension host 402. Such resource handling may be implemented using the same URI mapping techniques described herein, by using URIs to refer to all resources contributed by extensions. Similarly, when the renderer 206 paints an icon in the UI, it can be painted with the URI "vscode-remote://". A protocol handler 412 may be implemented, e.g., for Electron or another software framework, to intercept the request for this URI and redirect it to the remote extension host agent 502.

Some implementations may execute the renderer process 206 with two extension hosts 402, one running locally and one running remotely. When launching the project being developed to be debugged, the project is launched from the remote extension host process. When launching a terminal or a task for debugging or another purpose, it may also be typically launched from the remote extension host process.

A performance benefit may follow from running two extension hosts, one local and one remote, when the setup uses a WAN with relatively high latency to connect the machines 202 and 204. UI extensions 912 can be executed on the local extension host (running on the developer's machine) at the same time other extensions can be executed on the remote extension host (which can be running in a Wide Area Network, e.g., in a machine in a remote cloud). For example, consider an extension 210 that emulates VIM mode in a VS Code tool. This extension ends up handling all user input, e.g., when "j" is pressed this information reaches the VIM extension, and then the VIM extension decides to move the cursor to the left if in normal mode, or insert "j" if in insert or append mode. The tool 400 can execute this extension locally whereas other extensions (like language support extensions 210) would execute remotely. Running the VIM extension or other UI extensions locally significantly reduces 1610 latency compared to running them in a machine in the cloud. Similar considerations may apply to a TypeScript basics extension, a material theme extension, a Rainbow extension, or other UI extensions 912.

In one variation, a development tool system 700 includes a local Docker container, the remote machine 204 is actually on the same physical machine as the developer machine, and the two filesystems of the respective machines are shared via volume mapping. Thus, the project being developed is visible to both the renderer process 206 and the extension host process 402 directly. One approach to implementing support for this variation uses a "file://"<->"file://" URI mapping. For example, if using a virtual machine 602 or container 910 where the folder developer machine/Users/alex/src/vscode is mapped to the virtual machine or container Z:\vscode, then the mapping will be consistent with the following:

On the renderer process 206 the file will use its canonical URI file:///Users/alex/src/vscode/folder1/file1.txt On the virtual machine or container the file will use the mapped URI file:///Z%3A/vscode/folder1/file1.txt The mapping 1510 will then be: file:///Users/alex/src/vscode/X<->file:///Z%3A/vscode/X As another variation, some implementations include a local machine cache for resources contributed by remote extensions. This provides an alternative to loading the associated icons or files from the remote machine each time a new development tool renderer window is opened. The cache gets invalidated when the remote extensions change or get updated.

Additional Observations

In some examples, the renderer process 206 never attempts to access workspace resources directly. It always respects the URI associated with resources and delegates to the remote extension host. This includes all filesystem accesses, and also includes all launching of processes, e.g. for debugging, terminal, tasks, file searching, and also accessing of environmental variables. The usage of URIs is chosen everywhere instead of file paths. The URI mapping and the involvement of the extension host agent makes it possible, with suitable modifications to the single-machine approach, for remote extension execution to work well.

In some examples, an extension host executes independently of the renderer process. For instance, a renderer process can interpret user input (e.g. typing in an editor) even if the connection to the extension host is interrupted or terminated.

In some examples, an extension API is synchronous for reading and asynchronous for writing. This architectural choice is followed as much as possible in some examples. In some, it may always be possible to make the extension API asynchronous for both reading and writing, but that might not give a consistent picture of the state of the renderer process.

In some examples, the renderer 206 maps URIs to filesystem paths for rendering purposes only, that is, only for operations that effect the user interface, as opposed to operations that alter or create or delete files 304 in the extension machine filesystem. The mapping is done for UI files that are not available on the developer machine.

In some examples, the extension 210 is binary-compatible with a single-machine deployment, namely, a deployment in which a renderer 206, an extension host 402, and the extension 210 run together on a single physical machine. Thus, an extension can be run unmodified (binary-compatible) remotely and also locally (single-machine deployment).

In some examples, the developer machine and the extension machine are different virtual machines running on the same physical machine M, the machine M has a filesystem FM, and a filesystem Fdev of the developer machine and a filesystem Fext of the extension machine are each mapped to the same filesystem FM of the machine M.

In some examples, a version of VS Code software which enhanced for remote extension execution as taught herein runs with a local extension host. Via the local extension host, one or more extensions 210 run in the same developer machine as the renderer. The local extension host may serve as a sandbox for extensions and decouple them from the renderer. In a "remote" mode, the same enhanced renderer 206 can connect to a remote extension host. This renderer 206 can talk to multiple extension hosts at the same time, not just to a single one. Thus, in some configurations one extension host is running on the extension host machine, and another extension host is running on the developer machine.

A subset of extensions 210 can be categorized as UI extensions 912. For instance, a UI extension 912 can extend VS Code software's functionality solely at the UI level by rendering the weather or stock prices in a status bar. Such UI extensions do not need filesystem access. Having them run on the same machine as the renderer 206 ensures a reduced latency.

Some embodiments also detect 1618 different network or machine connections 1616 and perform syncing 1620 accordingly. For example, assume a project to be developed resides on the developer machine, e.g. a laptop. When the developer uses their laptop, they can use the development tool 400 to work on their project in a familiar manner. When the developer machine becomes docked at the office (e.g., the developer plugs the machine into an office Ethernet, or connects to the office wireless LAN), the development tool 400 detects this connection and automatically operates consistent with the following:

uploads 1622 all the developer files from the developer machine to an extension host machine that sits in the office (or does a delta upload of changes made since the last time the developer was connected in the office;

terminates 1626 the local running extension host;

connects to the remote extension host machine, which now has a filesystem clone of the project;

the remote extension host runs on this filesystem clone;

whenever files are modified in the filesystem clone, those modifications are synced back to the developer machine;

the developer can execute the project for testing purposes on their machine or on the extension host machine.

When connectivity is lost (e.g., the developer leaves the office), the development tool 400 detects this loss, closes the connection (if it isn't closed already), and launches 1624 a local extension host. Since the filesystem has been synced all along, the developer can continue working on their laptop. In a variation, the extension host machine sits in the cloud (via a WAN), not in the office (on a LAN), so when the developer is connected to the internet they can use a separate extension host machine. When the developer is not connected to the internet the tool executes everything locally.

Some embodiments have a zero tool install characteristic. The remote extension host together with the desired extensions and their prerequisites is run in a local container. A developer then no longer has to install the tool chain manually on the local machine, but can just run the container and connect to it from a suitably enhanced Visual Studio® Code tool or other development tool 400.

Some embodiments have a Leverage Linux Tool Chains (WSL) characteristic. The remote extension host runs inside Windows Subsystem for Linux (WSL). The developer connects from VS Code software running on Windows, and connects to the remote extension host inside WSL. This enables the transparent use of Linux® tool chains from Windows® environments.

Some embodiments have a Leverage Hardware characteristic. The remote extension host runs on a machine that is more powerful than the developer machine, e.g., one which provides additional CPU and RAM to a developer.

As to extensions 210, one of skill will acknowledge the following. The development tool is extensible with extensions 210, which enrich the tool with additional services, e.g., support for a particular programming language. In many cases, extensions are implemented against an extension API in an extension host. Teachings provided herein support software development on a remote machine. Developed source code can be kept on only the remote machine, off of the developer's local machine, to provide security against accidental or intentional violations of the source code's confidentiality or integrity, and to protect the intellectual property the source code represents. Remote extension execution technologies also allow extensions, which can be compute intense, to run on a more powerful remote machine, and support sandboxing of the extensions so that the local machine is protected from malicious extensions. Some embodiments hide whether the extensions run locally with everything on the local machine, or instead run remotely, with the UI on the local machine and the rest of the tool software running on the remote machine. In some embodiments, extension authors do not have to implement a different extension for the local than for the remote setup. Some embodiments provide or support a rich ecosystem of extensions that support both setups (local or remote). In some, a user has still access to all the local tools even when developing remotely.

Building blocks used in some embodiments include an extension API that enables extensions to run remotely, an agent that maps file references in the API to the remote location and the other way around, and an extension host that can host and run unmodified extensions remotely.

Enhancements described herein support transparent remote execution of development tool extensions 210. Compute-intensive extensions 210 may be executed on an extension machine 204 external to a developer machine 202 which runs a user interface renderer 206 of the development tool 400. User interface extensions 912 may run locally. Instead of sharing a filesystem 302, the renderer on the developer machine and an extension host 402 and extension (s) on the extension machine may access distinct respective machine filesystems. Instead of spawning debug extension processes 1422 and other extension-support processes 1306 locally, the renderer may instruct the extension host or an extension host agent 502 to spawn the processes remotely on the extension machine. No change is needed to extensions 210; existing extensions and newly created extensions 210 are binary-compatible with single-machine or multi-machine development tool 400 deployments. Project files 304 remain inside a firewalled and data-loss-prevention environment while nonetheless being fully accessible to authorized developers 104 working remotely and to operations performed by language servers 406, debug adapters 408, and tool extensions.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants describe above.

CONCLUSION

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 15 and 16 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. An extension machine suitable for use in a development tool system and configured to interoperate with a local development tool extension ("extension") which upon execution on the extension machine performs software development operations on file contents, the extension machine comprising:
   a processor;
   a memory in operable communication with the processor;
   a local extension host agent ("agent") which upon execution with the processor communicates with a remote development tool user interface renderer ("renderer") that resides on a developer machine external to the extension machine;
   a local extension host ("host") which is configured for operable communication with the local agent and with the local extension and with a local store which has a filesystem containing software development files ("files");
   wherein multiple files in the local store are identified in at least one place outside the extension machine by respective uniform resource identifiers ("URI") file IDs, and those URI file IDs get mapped to filesystem paths for use in the local extension to identify the files in order to obtain the file contents; and
   wherein the local extension host agent, local extension host, local agent, local extension, and local store are each local to the extension machine and remote from the developer machine.

2. The extension machine of claim 1, further comprising the extension.

3. The extension machine of claim 1, wherein at least one of the following deployment conditions is satisfied:
   the developer machine is a physical machine, and the extension machine is a different physical machine than the developer machine;
   the developer machine is a physical machine, the extension machine is a different physical machine than the developer machine, and the extension machine processor is faster than any processor of the developer machine;
   the developer machine is a physical machine, the extension machine is a different physical machine than the developer machine, and the extension machine has more processor cores than the developer machine;
   the developer machine is a physical machine, the extension machine is a different physical machine than the developer machine, and the extension machine memory has more random access memory capacity than any memory of the developer machine;
   the developer machine is a virtual machine, and the extension machine is a different virtual machine than the developer machine;
   the developer machine and the extension machine are each a respective virtual machine, and both of these virtual machines are running on one and the same physical machine.

4. The extension machine of claim 1, wherein at least one of the following mapping conditions is satisfied:
   the agent maps the URI file IDs to respective filesystem paths for use by the extension to identify the files to obtain the file contents;
   the host maps the URI file IDs to respective filesystem paths for use by the extension to identify the files to obtain the file contents.

5. The extension machine of claim 1, wherein at least one of the following URI format conditions is satisfied by at least one URI file ID which gets mapped to a filesystem path used by the extension:
   a URI in the URI file ID includes an IP address and port of the extension machine;
   a URI in the URI file ID includes a symbolic name which is resolvable to a network socket of the extension machine.

6. The extension machine of claim 1, wherein the extension runs in a compatibility layer, and the compatibility layer is configured to provide functional compatibility between two operating systems of different kinds.

7. The extension machine of claim 1, wherein the extension machine and the developer machine are located on different respective sides of a firewall.

8. The extension machine of claim 1, wherein the extension runs in a sandbox and the renderer is located outside the sandbox.

9. The extension machine of claim 1, wherein at least one of the following synchronization conditions is satisfied:
   the extension includes an extension application program interface ("API") which is configured to operate synchronously when reading and asynchronously when writing;

the extension includes an extension API which is configured to read and write through a data model layer;

the host is configured to execute independently of the renderer.

10. A developer machine suitable for use in a development tool system and configured to interoperate with a remote development tool extension ("extension") which upon execution performs software development operations on remote file contents, the developer machine comprising:

a processor;

a memory in operable communication with the processor;

a development tool user interface renderer ("renderer") which upon execution with the processor communicates with the remote extension by sending and receiving inter-machine communications which identify one or more of the software development operations, the remote extension residing on an extension machine that is external to the developer machine, the renderer configured to use uniform resource identifiers ("URIs") to identify files in a remote filesystem in a store on the extension machine;

wherein the renderer is further configured to specify in one or more of the inter-machine communications one or more development processes to be spawned remotely on the extension machine instead of the renderer spawning those development processes on the developer machine.

11. The developer machine of claim 10, wherein the renderer is configured to specify, in one or more of the inter-machine communications, one or more of the following development processes to be spawned on the extension machine:

execution of a script on the extension machine;
a terminal emulation;
a static analysis tool;
a filesystem search process;
a process which accesses an environment variable of the extension machine;
a process that compiles source code into binary form which is tailored for execution on the extension machine;
a debug extension process;
a programming language server process.

12. The developer machine of claim 10, in combination with the extension machine, the extension machine comprising:

an extension machine processor;
an extension machine memory in operable communication with the extension machine processor;
an extension host agent ("agent") which upon execution with the extension machine processor communicates with the renderer; and
an extension host ("host") which is configured for operable communication with the agent and with the extension and with the store.

13. A method for executing a development tool extension ("extension") to perform software development operations on file contents, the method comprising:

running a development tool user interface renderer ("renderer") on a developer machine;

connecting the developer machine to an extension machine for inter-machine communications;

executing the extension on the extension machine, the extension machine having a store which is configured by a filesystem containing software development files;

identifying at least one of the software development files in the renderer using a uniform resource identifier file identification ("URI file ID");

automatically mapping the URI file ID into a filesystem path file identification ("path file ID") of the software development file;

accessing the software development file in the store using the path file ID; and operating on file contents of the accessed software development file in the extension.

14. The method of claim 13, wherein the method provides transparent remote execution of the development tool extension in at least one of the following ways:

the extension operates equally on the file contents regardless of whether the developer machine and the extension machine share the same filesystem or have separate respective filesystems;

the extension operates equally on the file contents regardless of whether the renderer and the extension are running on the same physical machine or on separate respective physical machines.

15. The method of claim 13, wherein the developer machine and the extension machine become disconnected after being connected, and the method further comprises the renderer interpreting user input while the machines are not connected.

16. The method of claim 13, further comprising caching in the developer machine a copy of at least part of a software development file which is stored in the filesystem in the store on the extension machine.

17. The method of claim 13, wherein mapping the URI file ID into the path file ID occurs in the renderer.

18. The method of claim 13, wherein connecting the developer machine to the extension machine includes obtaining a network connection.

19. The method of claim 13, wherein the extension is a first development tool extension ("first extension"), and the renderer communicates with the first extension by communications which are subject to a first latency level, and the method further comprises running a second development tool extension ("second extension") on a machine which is not the same extension machine running the first extension, and the renderer communicates with the second extension by communications which are subject to a second latency level which is less than the first latency level.

20. The method of claim 13, further comprising automatically synchronizing copies of at least one of the software development files in response to detecting which network or which other machine, if any, the developer machine is connected to over a network connection.

* * * * *